US006939021B2

(12) United States Patent
Leslie et al.

(10) Patent No.: US 6,939,021 B2
(45) Date of Patent: Sep. 6, 2005

(54) TRIANGULAR LIGHT ASSEMBLY WITH FLASHING AND NON-FLASHING LIGHTS

(75) Inventors: Stuart Leslie, Larchmont, NY (US); Roland Zeder, New York, NY (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/858,713

(22) Filed: Jun. 2, 2004

(65) Prior Publication Data

US 2005/0135092 A1 Jun. 23, 2005

Related U.S. Application Data

(60) Provisional application No. 60/530,578, filed on Dec. 18, 2003.

(51) Int. Cl.[7] ............................................ F21V 33/00

(52) U.S. Cl. ..................... 362/109; 362/252; 362/399; 362/542; 362/545; 340/471; 340/473; 340/815.45; 40/442; 40/443; 40/550

(58) Field of Search .......................... 362/23, 540, 542, 362/109, 157, 184, 190, 197, 199, 208, 227, 362/235, 236, 237, 240, 362, 368, 800, 812, 362/28, 459, 543–546, 249, 252, 370, 371, 362/382, 399; 40/204, 205, 124.02, 550, 40/581, 584, 610, 612, 442, 443, 427, 541–544; 116/28 R, 48, 49, 54, 200, 202; 340/425.5, 340/463, 464, 468, 469, 471, 473, 815.45, 340/815.4, 368, 369

(56) References Cited

U.S. PATENT DOCUMENTS

| | | | | | |
|---|---|---|---|---|---|
| 4,164,008 | A | * | 8/1979 | Miller et al. | 362/103 |
| 4,613,847 | A | * | 9/1986 | Scolari et al. | 340/473 |
| 4,734,832 | A | * | 3/1988 | Moriano et al. | 362/158 |
| 4,875,028 | A | * | 10/1989 | Chou | 340/473 |
| 4,952,910 | A | * | 8/1990 | Straten et al. | 340/473 |
| 5,019,951 | A | * | 5/1991 | Osterhout et al. | 362/191 |
| 5,122,939 | A | * | 6/1992 | Kazdan et al. | 362/243 |
| 5,349,346 | A | | 9/1994 | Wu | 340/908 |
| 5,419,065 | A | * | 5/1995 | Lin | 40/550 |
| 5,512,876 | A | | 4/1996 | Brusca | 340/471 |
| 5,558,427 | A | * | 9/1996 | Yang | 362/503 |
| 5,559,681 | A | * | 9/1996 | Duarte | 362/252 |
| 5,606,309 | A | * | 2/1997 | Smith | 340/473 |
| 5,627,513 | A | * | 5/1997 | Weed et al. | 340/473 |
| 5,651,636 | A | * | 7/1997 | Yeh | 340/473 |
| 5,775,253 | A | * | 7/1998 | Quan et al. | 40/612 |
| 5,831,522 | A | | 11/1998 | Weed et al. | 340/473 |
| 5,970,639 | A | * | 10/1999 | Hui | 40/610 |

(Continued)

*Primary Examiner*—John Anthony Ward
*Assistant Examiner*—Ismael Negron

(57) ABSTRACT

A light assembly includes a generally triangular shaped housing having a front surface and a back surface opposite the front surface. The light assembly further includes at least a first light emitting device disposed in the housing configured to emit a non-flashing light from the front surface of the housing. Finally, the light assembly includes at least a second light emitting device disposed in the housing configured to emit a flashing light from the back surface of the housing.

18 Claims, 4 Drawing Sheets

U.S. PATENT DOCUMENTS 6,092,318 A * 7/2000 Arie et al. .................... 40/547
6,275,149 B1 * 8/2001 Tung .......................... 340/473
6,389,720 B1 5/2002 Hsieh .......................... 40/593
6,419,377 B1 * 7/2002 Yuen .......................... 362/199
6,535,117 B2 3/2003 Haerer ........................ 340/473
6,543,165 B2 * 4/2003 Youseph et al. .............. 40/610

* cited by examiner

TRIANGULAR LIGHT ASSEMBLY WITH FLASHING AND NON-FLASHING LIGHTS

CROSS REFERENCE TO RELATED APPLICATIONS

This application claims the benefit of U.S. Provisional patent application Ser. No. 60/530,578, filed Dec. 18, 2003, the contents of which are incorporated herein by reference thereto.

TECHNICAL FIELD

The present invention relates to a light assembly, and in particular to a light assembly that includes both flashing warning lights and non-flashing lights for viewing objects.

BACKGROUND

Disabled vehicles on highways, local and/or inner city streets may cause traffic jams, as well as blocking a shoulder or a portion of the roadway depending upon the location of the disabled vehicle. In order to provide an indication to other motorists who may be traveling towards the disabled vehicle, it is desirable to provide some sort of indication means that would effectively notify the oncoming motorists that the vehicle is disabled. This is particularly important in nighttime or other operating conditions when visibility is limited.

One typical means for notifying oncoming motorists that a vehicle is disabled is the use of flares. In addition, when a vehicle is disabled and depending upon the time of day and/or weather conditions, the operator may desire a flashlight for use during repair to the vehicle. For example, an operator changing a tire at nighttime will require the use of flashlight.

Accordingly, it is desirable to provide a portable device for use in the vehicle which provides the dual functions of a light source as well as a signaling device for other motorists, highway patrolmen, truck drivers and tow truck drivers.

SUMMARY OF THE INVENTION

Disclosed herein is a light assembly that includes a generally triangular shaped housing having a front surface and a back surface opposite the front surface. The light assembly further includes at least a first light-emitting device disposed in the housing configured to emit a non-flashing light from the front surface of the housing. Finally, the light assembly includes at least a second light-emitting device disposed in the housing configured to emit a flashing light from the back surface of the housing.

It should be noted that triangular shaped objects generally denote a warning to vehicular motorists. Thus, the generally triangular shaped light assembly should be readily recognized as a warning light to vehicular motorists.

DETAILED DESCRIPTION OF EXEMPLARY EMBODIMENTS OF THE INVENTION

Figure 1:
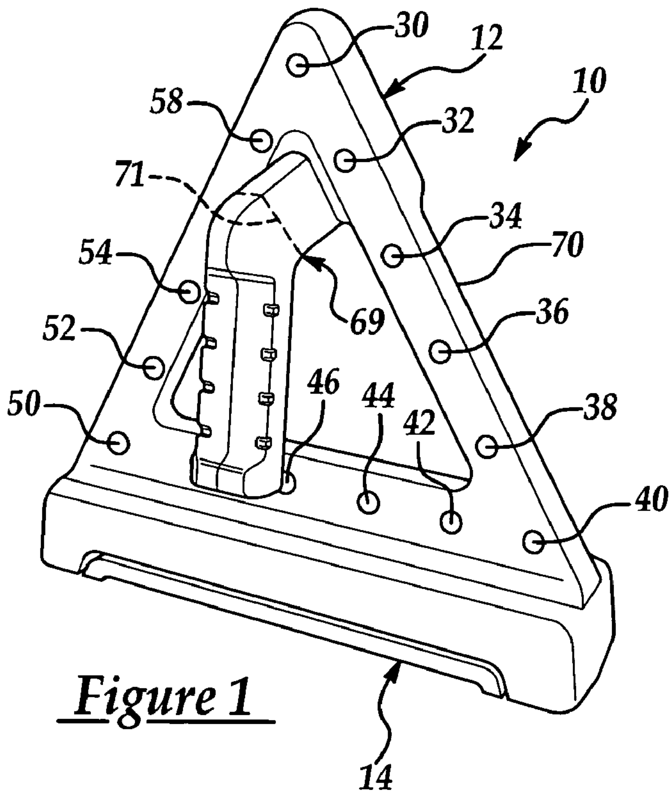
FIG. 1 is a rear perspective view of an exemplary embodiment of a light assembly.
Figure 4:
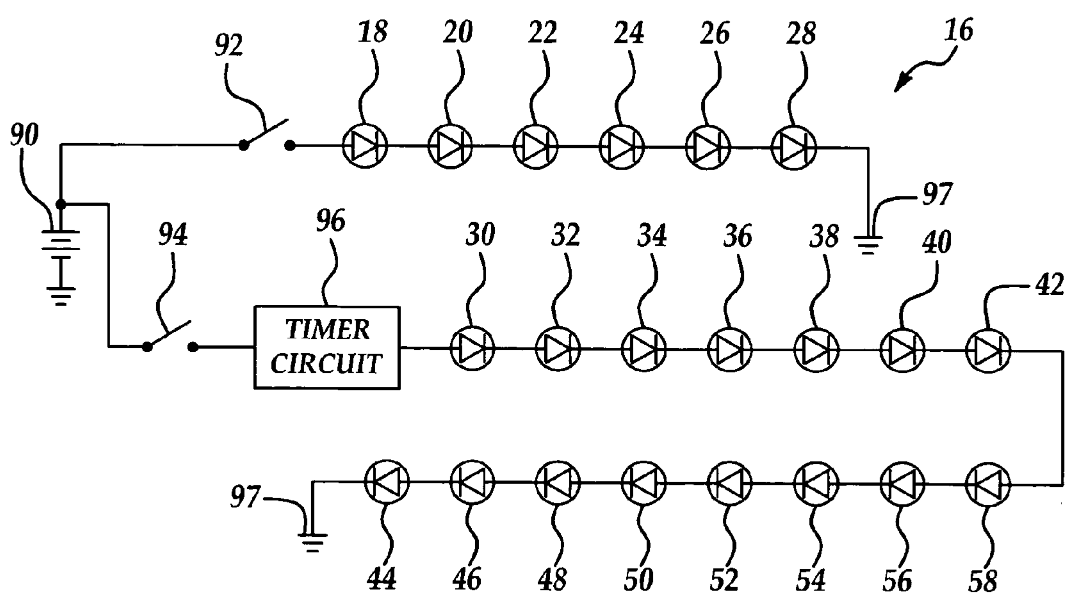
FIG. 4 is a schematic of an electrical circuit utilized in an exemplary embodiment of the light assembly.

Referring to FIGS. 1 and 4, a light assembly 10 having both the functionality of a warning light and a flashlight in accordance with an exemplary embodiment is illustrated. Light assembly 10 includes a housing 12, a rotatable base 14, and an electrical circuit 16.

Figure 3:
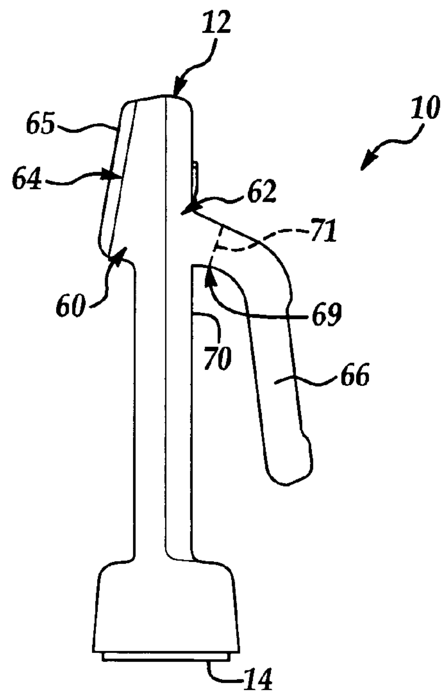
FIG. 3 is a side view of an exemplary embodiment of the light assembly.

Referring to FIG. 3, housing 12 includes a front housing portion 60, a rear housing portion 62, and a transparent lens 64. Housing portions 60, 62 are preferably coupled together with screws (not shown). Further, housing portions 60, 62 define an interior space configured to hold therein the electrical circuit 16 which includes a plurality of light emitting diodes. Front housing portion 60 is preferably constructed from an opaque plastic. Rear housing portion 62 is preferably constructed from a substantially transparent plastic having a substantially red color. As shown, rear housing portion 62 includes an outer surface 70 from which light is emitted. The housing portion 62 further includes a handle 66 to allow a user of light assembly 10 to move assembly 10 easily. Thus, handle 66 allows a user to easily direct the light source of light-emitting diodes 18–28 towards an area requiring illumination. Handle 66 is split at dashed line 71 and can rotate about a pivot point or hinge 69 toward surface 70 for ease of storage of light assembly 10. Further, handle 66 can be rotated about pivot point 69 to the position shown in FIG. 1 to allow a user to easily hold light assembly 10 in their hand. Transparent lens 64 includes an outer surface 65 from which light is emitted. Lens 64 is preferably constructed from a transparent clear plastic.

Rotatable base 14 is provided to allow housing 12 to be rotated relative to base 14 to a desired position. Rotatable base 14 is preferably constructed from plastic and is rotatably coupled to housing 12 utilizing a screw (not shown). The rotatable base 14 can be rotatably positioned under housing 12 for flat storage of the light assembly 10. The rotatable base 14 also supports the housing 12 in an upright position when the base is disposed on an irregular or non-flat surface.

Referring to FIG. 4, electrical circuit 16 includes a voltage source 90, first and second switches 92, 94, a timer circuit 96, and light emitting diodes (LEDS) 18, 20, 22, 24, 26, 28, 30, 32, 34, 36, 38, 40, 42, 44, 46, 48, 50, 52, 54, 56, 58. Voltage source 90 may comprise a conventional battery. Switches 92, 94 may comprise conventional normally-open contact switches. As shown, switch 92 is connected in series between voltage source 90 and LEDs 18–28. When switch 92 is moved to a closed operational position, LEDs 18–28 emit light that propagates through transparent lens 64.

Switch 94 is connected in series with a timer circuit 96. Circuit 96 is a conventional timer circuit which periodically energizes LEDs 30–58 so that LEDs 30–58 flash at periodic intervals. Circuit 96 comprises the timer circuit disclosed in U.S. Pat. No. 5,627,513, entitled "Portable Visual Emergency Signal Device" filed on Apr. 25, 1995, which is incorporated herein in its entirety. However, it should be noted that a plurality of other configurations of timer circuit 96 could be utilized in light assembly 10. As shown, LEDs 30–58 are connected in series between timer circuit 96 and a ground 97.

Figure 2:
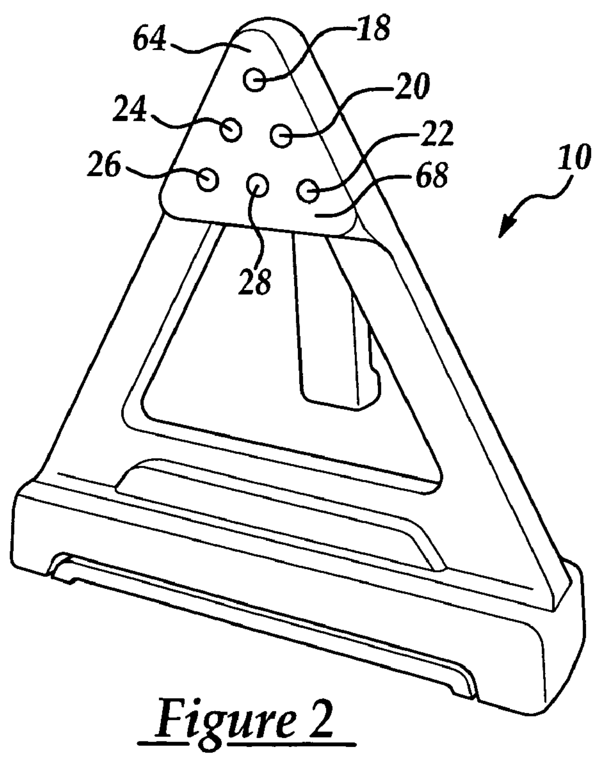
FIG. 2 is a front perspective view of an exemplary embodiment of the light assembly.

Referring to FIG. 2, LEDs 18–28 are disposed within transparent lens 64 and emit substantially white light from surface 65 of lens 64. LEDs 18–28 may be mounted on one or more PCB boards (not shown). When a user of light assembly 10 actuates switch 92, LEDs 18–28 may emit light that can be used for viewing objects at night. It should be noted that in an alternate embodiment one more of LEDs 18–28 could be replaced with halogen bulbs or other equivalent light emitting sources.

Referring to FIG. 1, LEDs 30–58 are disposed within housing 12 proximate rear housing portion 62. In particular, LEDs 30–58 may be mounted on one or more PCB boards (not shown) disposed within housing 12. As discussed above, rear housing portion 62 is constructed from a substantially transparent red plastic. Thus, the emitted light through a surface 70 of rear housing portion 62 has a substantially red color. Further, LEDs 30–58 may be periodically flashed by timer circuit 96. Thus, a user of light assembly 10 can move switch 94 to a closed operational position to obtain a flashing warning light that can be used at night to warn other people that a person or a vehicle is proximate the light assembly 10. It should be noted that in an alternate embodiment of assembly 10, one more of LEDs 30–58 could be replaced with halogen bulbs or any other type of electrically or chemically activated light emitting device.

Referring to FIGS. 5–9, a light assembly 108 having both the functionality of a warning light and a flashlight in accordance with another exemplary embodiment is illustrated. Light assembly 108 includes a housing 109, a transparent lens 114, a rotatable base 116, and an electrical circuit 118.

Figure 6:
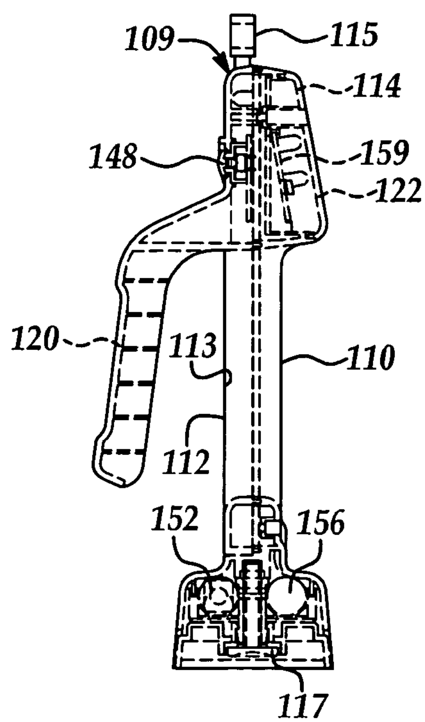
FIG. 6 is a side cross-sectional view of another exemplary embodiment of the light assembly.
Figure 7:
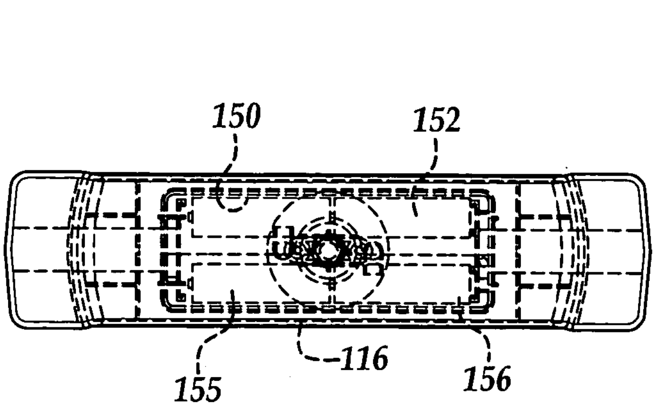
FIG. 7 is a bottom view of a rotatable base utilized in another exemplary embodiment of the light assembly.

Referring to FIG. 6, housing 109 includes a front housing portion 110 and a rear housing portion 112. Housing portions 110, 112 are preferably coupled together with screws and may have an O-ring gasket (not shown) disposed therebetween. Further, housing portions 110, 112 define an interior space configured to hold therein electrical circuit 118 which may includes a plurality of PCB boards, light emitting diodes, and batteries described below. Front housing portion 110 is preferably constructed from an opaque plastic. Rear housing portion 112 is preferably constructed from a substantially transparent plastic having a substantially red color. As shown, rear housing portion 112 includes an outer surface 113 from which light is emitted. Housing portion 112 further includes a handle 120 to allow a user of light assembly 108 to move assembly 108 easily. Housing portion 112 further includes an eyelet 115 coupled to an upper portion of rear housing portion 112 to allow light assembly 108 to be hung above the ground.

Referring to FIGS. 5–8, transparent lens 114 includes an outer surface 122 from which light is emitted. Lens 114 is preferably constructed from a transparent clear plastic and may be coupled to housing portion 110 using screws or may be configured to snap into housing portion 110.

Rotatable base 116 is provided to allow housing 109 to be rotated relative to base 116. Base 116 is preferably constructed from plastic and may be rotatably coupled to housing 109 utilizing a screw 117. In an alternate embodiment, screw 117 could be replaced with a dowel pin that would also allow base 116 to rotate relative to housing 109. The base 116 can be rotated from a stored position to a deployed position by rotating base 116 so that two ends of base 116 are disposed outwardly from the remainder of the housing 109 for providing multiple surface areas for supporting the light assembly 108. The additional surfaces will provide a more stable support of the light assembly 108 on non-flat surfaces or when vehicles driving past the light assembly 108 induce wind gusts against the assembly.

Figure 5:
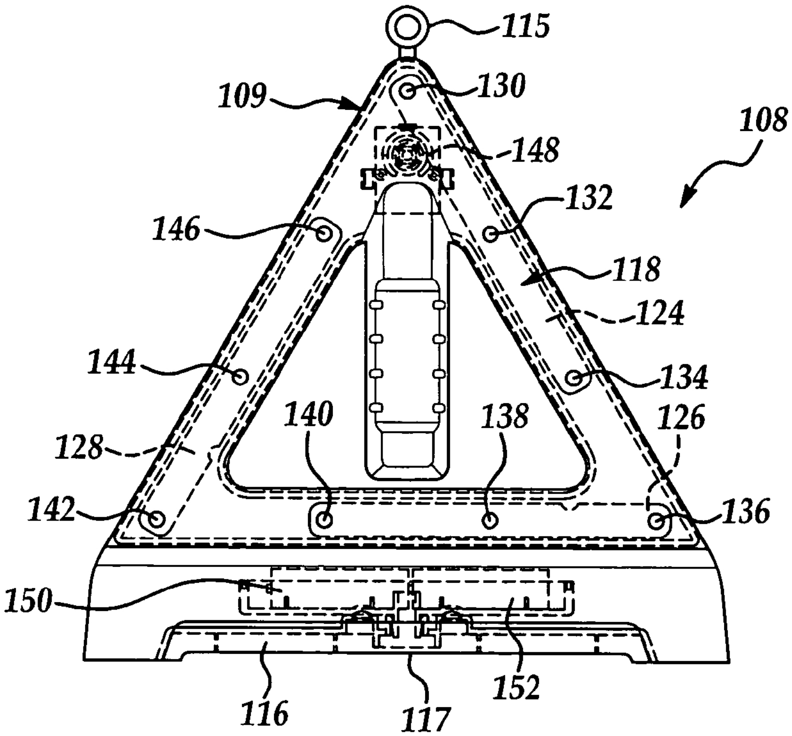
FIG. 5 is a rear view of another exemplary embodiment of a light assembly.
Figure 8:
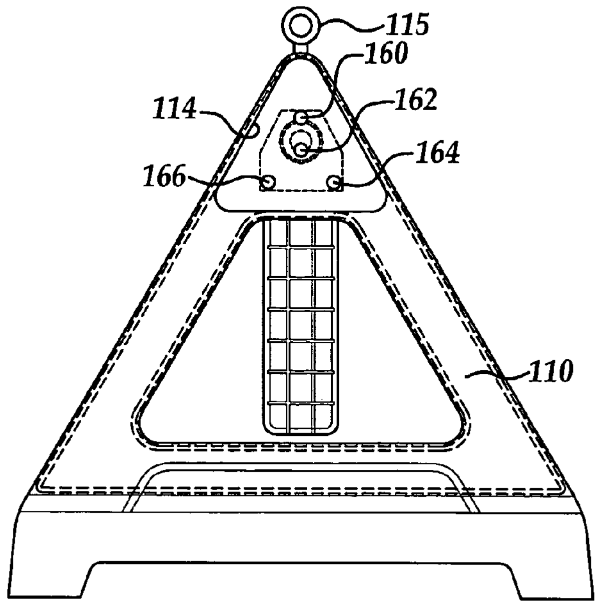
FIG. 8 is a front view of another exemplary embodiment of the light assembly, excluding the rotatable base.
Figure 9:
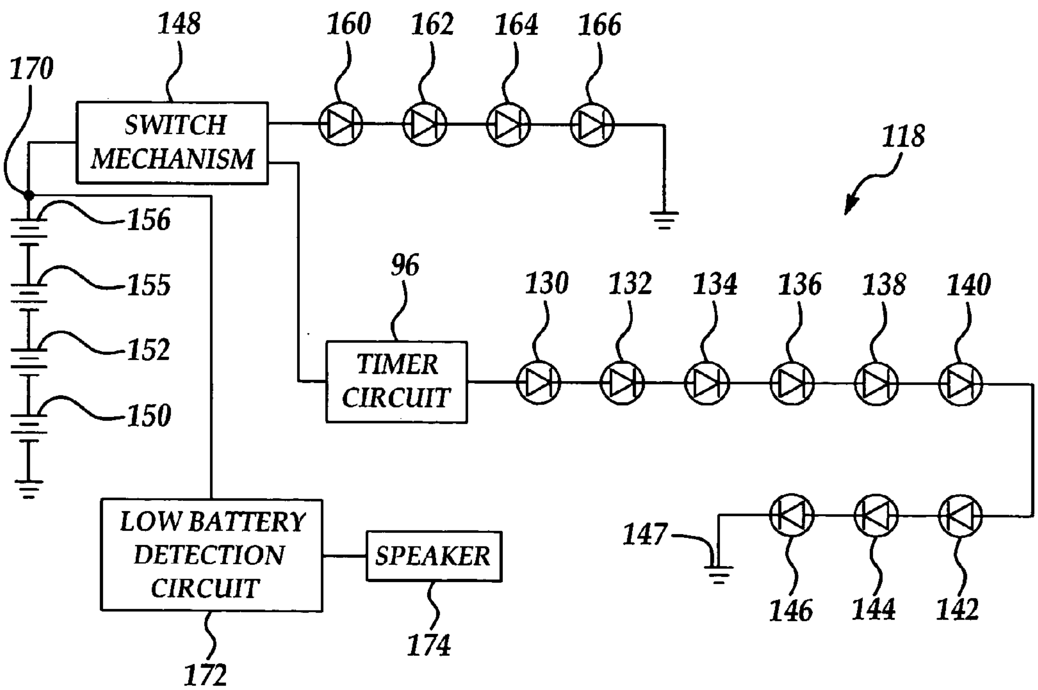
FIG. 9 is a schematic of an electrical circuit utilized in an exemplary embodiment of the light assembly.

Referring to FIGS. 5, 8 and 9, electrical circuit 118 includes batteries 150, 152, 155, and 156, a switch mechanism 148, a timer circuit 96, LEDS 130, 132, 134, 136, 138, 140, 142, 144, 146, 160, 162, 164, 166, a low battery detection circuit 172, and a speaker 174. As shown, switch 148 is connected in series between batteries 150, 152, 155, 156 and LEDs 160–166.

Referring to FIGS. 6 and 8, LEDs 160–166 may be electrically connected in series and disposed on a PCB board 159 that is fixedly mounted within housing portion 110. LEDs 160–166 may be mounted at a 10 degree angle with respect to a vertical axis extending through assembly 108. When a member (not shown) of switch mechanism 148 is depressed once, LEDs 160–166 are configured to transmit substantially white light through lens 114.

Referring to FIGS. 5 and 9, LEDs 130–146 may be electrically connected in series between timer circuit 96 and ground 147. Further, LEDs 130–146 are mounted on one or more PCB boards. LEDs 130, 132, 134 are mounted on a PCB board 124 which is fixedly attached within an interior of housing 109. LEDs 136, 138, 140 are mounted on a PCB board 126 which is fixedly attached within an interior of housing 109. Further, LEDs 142, 144, 146 are mounted on a PCB board 128 which is fixedly attached within an interior of housing 109. Referring to FIGS. 5 and 6, LEDs 130–146 are disposed within housing 109 proximate rear housing portion 112. As discussed above, rear housing portion 112 is constructed from a substantially transparent red plastic. Thus, the emitted light through a surface 113 of rear housing portion 112 has a substantially red color.

As discussed above, circuit 96 is a conventional timer circuit and may comprise the timer circuit disclosed in U.S. Pat. No. 5,627,513, entitled "Portable Visual Emergency Signal Device" filed on Apr. 25, 1995, which is incorporated herein in its entirety. Timer circuit 96 is electrically connected in series with LEDs 130–146 to periodically energize LEDS 130–146 to emit a flashing light. In an alternate embodiment of circuit 118, circuit 96 could be removed so that LEDS 130–146 would be directly coupled in series with switch mechanism 148 so that LEDs 130–146 would emit a non-flashing light when LEDs 130–146 are energized.

Switch mechanism 148 is further connected in series between batteries 150, 152, 155, 156 and timer circuit 96. When a member (not shown) of switch mechanism 148 is depressed a first time, LEDs 160–166 are energized and emit light through transparent lens 114. When the member of switch mechanism 148 is depressed a second time, timer circuit 96 is energized. Thereafter, circuit 96 induces LEDs 130–146 to emit a blinking red light at periodic intervals through rear housing portion 112. When the member of switch mechanism 148 is depressed a third time, all of the LEDs of circuit 118 are turned off.

LEDs 130–146 and 160–166 provide a relatively high intensity light with a relatively low power consumption. It should be noted that in an alternate embodiment of light assembly 108, one or more of LEDs 160–166 and LEDs 130–146 could be replaced with halogen bulbs or any other type of electrically or chemically activated light emitting device.

Low battery detection circuit 172 is provided to determine when an operational voltage produced by batteries 156, 155, 152, and 150 is less than a desired operational voltage. Circuit 172 can be implemented using conventional circuit components such as solid state comparator circuits for example. Circuit 172 is electrically coupled to a node 170 between battery 155 and switch mechanism 148. When circuit 172 detects an operational voltage at node 170 less than the desired operational voltage, circuit 172 generates a signal that induces speaker 174 to generate an audible beeping sound. The beeping sound will indicate to a user that the batteries 156, 155, 152, 150 need to be replaced.

The embodiments of the inventive light assembly provide substantial advantages over known light assemblies. In particular, the inventive light assemblies provide a dual function of a light source as well as a signaling device for other motorists, highway patrolmen, truck drivers and tow truck drivers. Further, the inventive light assemblies are portable and storable within a vehicle.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A light assembly, comprising:

a generally triangular shaped housing having a front surface and a back surface opposite the front surface;

at least a first light emitting device disposed in the housing configured to emit a non-flashing light from the front surface of the housing;

at least a second light emitting device disposed in the housing configured to emit a flashing light from the back surface of the housing; and a handle extending from the back surface of the housing.

2. The light assembly of claim 1 wherein first and second light emitting devices are light emitting diodes.

3. The light assembly of claim 1 wherein said handle is configured to pivot about a pivot point.

4. The light assembly of claim 1 wherein the housing is constructed from a plastic material.

5. The light assembly of claim 1 further comprising a plurality of second light emitting devices disposed in the housing configured to emit flashing light from the back surface of the housing, the plurality of second light emitting devices disposed around a perimeter of the housing defined by the back surface.

6. The light assembly of claim 1 further comprising a plurality of first light emitting devices disposed in the housing configured to emit non-flashing lights from the front surface of the housing.

7. The light assembly of claim 1 wherein the plurality of first light emitting devices disposed in the housing are disposed proximate one another.

8. The light assembly of claim 1 wherein the non-flashing light is a substantially white light.

9. The light assembly of claim 1 wherein a portion of the back surface proximate the second light emitting device is constructed from a substantially transparent red plastic and the light emitted from the housing comprises a substantially red light.

10. The light assembly of claim 1 further comprising an electrical circuit having a first switch controlling current flow to the first light emitting device and the second light emitting device, the first light emitting device emitting the non-flashing light when the first switch is in a closed operational position and the second light emitting device emitting a flashing light when the first switch is in a closed operational position.

11. The light assembly of claim 1 further comprising a low battery detection circuit for detecting when a voltage produced by one or more batteries in said assembly is less than a desired operational voltage.

12. The light assembly of claim 1 wherein said triangular shaped housing comprises an eyelet portion to allow said light assembly to be hung above ground level.

13. The light assembly of claim 1 wherein a portion of the front surface proximate the first light emitting device is substantially transparent.

14. The light assembly of claim 13 wherein a portion of the back surface proximate the second light emitting device is substantially transparent.

15. The light assembly of claim 1 further comprising a rotatable base connected to the housing for allowing the housing to rotate about the base.

16. The light assembly of claim 15 wherein the first light emitting device is disposed at an end of the housing opposite the rotatable base.

17. The light assembly of claim 1 further comprising an electrical circuit having a first switch operatively coupled to the first light emitting device, the first light emitting device emitting the non-flashing light when the first switch is in a closed operational position.

18. The light assembly of claim 17 wherein the electrical circuit further comprises a second switch operatively coupled to the second light emitting device, the second light emitting device emitting the flashing light when the second switch is in a closed operational position.

* * * * *